United States Patent [19]

Aonuma et al.

[11] Patent Number: 5,157,083
[45] Date of Patent: Oct. 20, 1992

[54] RUBBER COMPOSITION

[75] Inventors: Mitsuyoshi Aonuma, Tokyo; Hiroshi Sakakida; Yoshiaki Aimura, both of Yokohama, all of Japan

[73] Assignee: Nippon Zeon Co Ltd, Tokyo, Japan

[21] Appl. No.: 350,583

[22] PCT Filed: Jun. 29, 1988

[86] PCT No.: PCT/JP88/00647
§ 371 Date: Feb. 15, 1989
§ 102(e) Date: Feb. 15, 1989

[87] PCT Pub. No.: WO89/00174
PCT Pub. Date: Jan. 12, 1989

[30] Foreign Application Priority Data

Jun. 29, 1987 [JP] Japan .................. 62-161468

[51] Int. Cl.[5] ............... C08F 279/04; C08F 279/06; C08F 8/42

[52] U.S. Cl. .................. 525/285; 525/196; 525/244; 525/258; 525/327.5; 525/282; 525/301; 525/384; 526/271; 524/600

[58] Field of Search ........... 525/285, 244, 258, 327.5, 525/196, 282, 301, 384; 526/279

[56] References Cited

U.S. PATENT DOCUMENTS

| 3,385,912 | 5/1968 | Harris | 525/258 |
| 4,033,888 | 7/1977 | Kiorsky | 525/285 |
| 4,332,918 | 6/1982 | Fukahori | 525/301 |
| 4,560,729 | 10/1984 | Watanabe et al. | 525/233 |
| 4,786,675 | 11/1988 | Iwata et al. | 525/109 X |

FOREIGN PATENT DOCUMENTS

| 2543006 | 7/1957 | Canada | 525/285 |
| 57-174346 | 10/1982 | Japan . | |
| 62-96543 | 5/1987 | Japan . | |
| 60-244784 | 5/1987 | Japan . | |

Primary Examiner—James J. Seidleck
Assistant Examiner—Vasu S. Jagannathan

[57] ABSTRACT

A rubber composition comprising a polymer obtained by adding maleic anhydride or a derivative thereof to a nitrile-group-containing highly saturated polymer rubber having an iodine value of 80 or less, which can be widely utilized in belts, hoses such as for hydraulic ones.

5 Claims, 1 Drawing Sheet

RUBBER COMPOSITION

TECHNICAL FIELD

This invention relates to a composition containing a novel rubber-like polymer and more particularly it relates to a rubber composition which has excellent strength characteristics while retaining a very good balance in performance characteristics such as oil resistance, heat resistance, weather resistance, and low-temperature resistance.

BACKGROUND ART

Rubber obtained by hydrogenating acrylonitrile-butadiene copolymer rubber (NBR) is well known as an excellent rubber having a good balance among oil resistance, heat resistance, weather resistance, low-temperature resistance and strength. Since hydrogenated NBR has such excellent characteristics, it is used for purposes requiring oil resistance, heat resistance and strength, for example, it is used in toothed transmission belts (timing belts) for automobiles.

However, also in such applications, from the viewpoint of long-term service, a high strength at ordinary temperature and high temperatures is required, and in order to insure efficient power transmission it has been desirable to improve the insufficient low-extension stress (e.g. 50% tension stress) at high temperatures which is a defect of hydrogenated NBR.

On the other hand, it is known that the strength of NBR can be improved by further copolymerizing a carboxyl-group-containing monomer. However, although excellent in strength at ordinary temperature and high temperatures, a hydride of the NBR obtained by copolymerizing a carboxyl-group-containing monomer is not much different from hydrogenated NBR in low-extension stress at high temperature, namely, it is not improved in low-extension stress.

DISCLOSURE OF THE INVENTION

It is an object of the present invention to provide a composition of a highly saturated nitrile-group-containing rubber, which has not only an improved strength at ordinary temperature and high temperatures but also an improved low-extension stress at high temperatures.

The present inventors have devoted themselves to research and consequently found that the above object can be achieved by using a rubber obtained by adding maleic anhydride or the like to a highly saturated nitrile-group-containing rubber, whereby the present invention has been accomplished.

Thus, according to the present invention, there is provided a rubber composition comprising a polymer obtained by adding maleic anhydride or a derivative thereof to a nitrile-group-containing highly saturated polymer rubber having an iodine value of 80 or less.

The nitrile-group-containing high saturated polymer rubber used in this invention includes rubbers obtained by hydrogenating the conjugated diene unit portions of unsaturated nitrile-conjugated diene copolymer rubbers, unsaturated nitrile-conjugated diene-ethylenic unsaturated monomer ternary copolymer rubbers, rubbers obtained by hydrogenating the conjugated diene unit portions of the ternary copolymer rubbers, unsaturated nitrile-ethylenic unsaturated monomer copolymer rubbers, etc. These nitrile-group-containing highly saturated polymer rubbers can be obtained by a conventional polymerization method and a conventional hydrogenation method, but needless to say, a method for producing said rubber is not critical in the present invention. Although not critical, the content of unsaturated nitrile in the nitrile-group-containing highly saturated polymer rubber is usually in the range of 10 to 60% by weight.

Examples of monomers used for producing nitrile-group-containing highly saturated polymer rubbers described above are given below.

The unsaturated nitriles include acrylonitrile, methacrylonitrile, etc. The conjugated dienes, include 1,3-butadiene, 2,3-dimethylbutadiene, isoprene, 1,3-pentadiene, etc. The ethylenic unsaturated monomers include, for example, vinyl aromatic compounds such as styrene, chlorostyrene, p-t-butylstyrene, chloromethylstyrene, and the like; esters of unsaturated carboxylic acids, such as methyl acrylate, 2-ethylhexyl acrylate, and the like; alkoxyalkyl esters of the aforesaid unsaturated carboxylic acids, such as methoxymethyl acrylate, ethoxyethyl acrylate, methoxyethoxyethyl acrylate, and the like; unsaturated carboxylic acid amides such as acrylamide, methacrylamide, and the like; and N-substituted (meth)acrylamides such as N-methylol(meth)acrylamide, N,N'-dimethylol(meth)acrylamide, N-ethoxymethyl(meth)acrylamide, and the like.

For producing the unsaturated nitrile-ethylenic unsaturated monomer copolymer rubbers, a non-conjugated diene such as vinylnorbornene, dicyclopentadiene, 1,4-hexadiene or the like may be copolymerized in place of a portion of said unsaturated monomer.

Specific examples of the nitrile-group-containing highly saturated polymer rubber used in this invention include hydrides of butadiene-acrylonitrile copolymer rubbers, isoprene-butadiene-acrylonitrile copolymer rubbers, and isoprene-acrylonitride copolymer rubbers; butadiene-methylacrylate-acrylonitrile copolymer rubbers, butadiene-styrene-acrylonitrile copolymer rubbers, and hydrides thereof; and butadiene-ethylene-acrylonitrile copolymer rubbers, butyl acrylate-ethoxyethyl acrylate-vinyl chloroacetate-acrylonitrile copolymer rubbers, and butyl acrylate-ethoxyethyl acrylate-vinylnorbonene-acrylonitrile copolymer rubbers.

Among these polymer rubbers, those having an iodine value of 80 or less should be selected. When the iodine value exceeds 80, the thermal aging resistance and the retention of strength at high temperatures will be lowered. The iodine value is preferably 50 or less. The iodine value is measured in accordance with JIS K0070.

The maleic anhydride and derivative thereof used in this invention include, for example, maleic anhydride, maleic acid, maleic acid monoalkyl esters such as monomethyl maleate, monoethyl maleate, monobutyl maleate, mono-2-ethylhexyl maleate and the like, and maleimides such as maleimide, N-methylmaleimide, N-ethylmaleimide, N-phenyllameimide and the like.

In this invention, for adding maleic anhydride or a derivative thereof to the nitrile-group-containing highly saturated polymer rubber, there is employed a method of en-addition to the nitrile-group-containing highly saturated polymer rubber at a high temperature, or a method of radical addition in the presence of a radical-generating agent. In the en-addition method and the radical addition method, the nitrile-group-containing highly saturated polymer rubber is subjected to addition reaction with maleic anhydride or a derivative thereof by heating the polymer rubber and maleic anhydride or the derivative thereof in an inert solvent capable of dissolving them, or by heating a mixture of the polymer rubber and maleic anhydride or the like. The addition reaction in the solution can be carried out in a chemical reaction container such as autoclave, and that in the solid state by means of a mixing machine such as internal mixer, kneading and extruding machine, or the like.

In this invention, although not critical, the amount of maleic anhydride or a derivative thereof added is preferably $1 \times 10^{-3}$ gram equivalent (ephr) or more, more preferably $5 \times 10^{-3}$ ephr or more in terms of acid equivalent of maleic anhydride or the derivative thereof, per 100 g of the nitrile-group-containing highly saturated polymer rubber from the viewpoint of low-extension stress at high temperatures.

The composition of the present invention is obtained by adding oxides of metals in group 2 of the periodic table, vulcanizing agents, antioxidants, fillers, etc. to the addition polymer obtained in the manner described above, and can give a vulcanizate having high stress and strength and excellent balance in performance characteristics such as oil resistance, heat resistance, weather resistance and low-temperature resistance.

Among these compounding ingredients which can be included in the composition of the present invention, the oxides of metals in group 2 of the periodic table include magnesium oxide, zinc oxide, calcium oxide, strontium oxide, etc. Among these metal oxides, zinc oxide and magnesium oxide are particularly preferable. The using amount of the metal oxides is usually 0.5 to 30 parts by weight per 100 parts by weight of said rubber (hereinafter the same applied).

The vulcanizing agents include sulfur and/or sulfur-donating compounds (hereinafter referred to as sulfur-containing vulcanizing agents in same cases), and organic peroxides. When among them, the sulfur-containing vulcanizing agent is used, stearic acid and various vulcanization accelerators are usually used together therewith.

The sulfur-containing vulcanizing agents include, for example, thiuram compounds such as tetramethyl thiuram disulfide, tetraethylthiuram disulfide and the like, and morpholine compounds such as morpholine disulfide and the like. The using amount of sulfur or the sulfur-donating compound is usually 0.1 to 5 parts by weight. Preferable examples of the vulcanization acclerators used together therewith are thiazole compounds such as 2-mercaptobenzothiazole, 2-mercaptothiazoline and the like, and sulfenamide compounds such as N-cyclohexyl-2-benzothiazyl sulfenamide and the like, from the viewpoint of heat resistance and strength, but other vulcanization accelerators may be used. The using amount of the vulcanization accelerators is usually in the range of 0.5 to 5 parts by weight.

The organic peroxides as vulcanizing agents include dicumyl peroxide, benzoyl peroxide, 2,4-dichlorodibenzoyl peroxide, 2,5-dimethyl-2,5-di(t-butylperoxy)-hexane, 2,5-dimethyl-2,5-di(t-butylperoxy)hexyne-3, 2,5-dimethyl-2,5-di(benzoylperoxy)hexane, t-butyl peroxybenzoate, etc.

The using amount of the organic peroxides is usually 0.5 to 15 parts by weight, preferably 4 to 10 parts by weight. When the organic peroxide is used as vulcanizing agent, there can be used together therewith vulcanization assistants, for example, polyfunctional monomers such as triallyl cyanurate, triallyl isocyanurate, trimethylolpropane trimethacrylate, ethylene dimethacrylate, divinylbenzene, diallyl phthalate, toluylene bismaleimide, and the like. The using amount of the vulcanization assistants is usually 1 to 10 parts by weight. It is also possible to improve the heat resistance by using polyhydric alcohols together with the organic peroxides. The polyhydric alcohols includes polyethylene glycol, polypropylene glycol, ethylene glycol, propylene glycol, etc. The using amount of the polyhydric alcohols is preferably in the range of 0.5 to 10 parts by weight.

As the antioxidants, when the sulfur-containing vulcanizing agent is used, antiozonant are preferred. The antiozonants include N-phenyl-N'-isopropyl-p-phenylenediamine, N-cyclohexyl-N'-phenyl-p-phenylenediamine, N-(1,3-dimethylbutyl)-N'-phenyl-p-phenylenediamine, N,N'-di(1-ethyl-3-methylpentyl)p-phenylenediamine, etc. The using amount of these compounds is usually in the range of 0.1 to 5 parts by weight. When the organic peroxide is used as vulcanizing agent, antiozonants need not be used.

From the viewpoint of heat resistance, employment of antioxidants is preferable. When the sulfur-containing vulcanizing agent is used, suitable examples of the oxidative deterioration resistors (antioxidants) include, for example, alkylated diphenylamines such as octylated diphenylamine and the like; amine compounds such as 4,4'-bis(α,α-dimethylbenzyl)diphenylamine and the like; and mercaptobenzimidazole compounds such as 2-mercaptobenzimidazole, zinc or nickel salts of 2-mercaptobenzimidazole, and the like. The using amount of these compounds is preferably in the range of 0.1 to 5 parts by weight.

When the organic peroxide is used as vulcanizing agent, suitable examples of the oxidative deterioration resistors include quinoline series oxidative deterioration resistors such as 6-ethoxy-2,2,4-trimethyl-1,2-dihydroquinoline, 2,2,4-trimethyl-1,2-dihydroquinoline polymers, 6-dodecyl-2,2,4-trimethyl-1,2-dihydroquinoline, and the like, and mercaptobenzimidazole series stabilizers such as 2-mercaptobenzimidazole, zinc or nickel salts of 2-mercaptobenzimidazole, and the like. The using amount of these compounds is preferably in the range of 0.1 to 5 parts by weight.

As the fillers usable in this invention, there may usually be exemplified inorganic fillers such as various carbon blacks, silica, calcium carbonate, clay, and the like, which are generally used in the rubber industry. The using amount of the fillers is usually 10 to 200 parts by weight.

In the present invention, the fillers are not limited to inorganic fillers and there can also be used, for example, organic fillers such as phenolic resins, xylene resins, melamine resins, and the like, and various single fibers such as glass single fiber, aramide single fiber (pulp), and the like.

The rubber composition of the present invention is produced by blending the above-mentioned various compounding ingredients with the nitrile-group-containing rubber of the present invention by means of a conventional mixing machine such as roll mill, Banbury mixer or the like. In this case, there can, if necessary, be blended therewith other compounding agents, for example, plasticizers, process oils, processing aids, pigments, and retardants.

The rubber composition thus obtained is subjected to a vulcanization step as it is or after being made into a composite with, for example, polyester woven cloth, nylon woven cloth, or cord-like fiber such as polyester fiber, glass fiber, aramide fiber, carbon fiber, steel fiber, or the like, whereby a desired rubber product is obtained.

A vulcanizate obtained by the use of the rubber composition of the present invention have not only excellent oil resistance, heat resistance, weather resistance and low-temperature resistance but also greatly improved stress, strength and dynamic fatigue resistance, and can be used for producing various products, for example, belts which undergo repeated deformation constantly, in particular, V belts, poly V belts, toothed transmission belts, etc., which are used in automobiles; hoses, e.g. power steering hoses for automobiles, high-pressure oil-resistant hoses including hydraulic hoses for various machines such as building machines, and fuel hoses for automobiles; various rubber products used in oil wells and gas wells, e.g. packers, blowout preventers and pipe protectors; various sealing materials, e.g. O rings, gaskets, oil seals, and Freon seals; various diaphragms; and friction discs such as driving clutch discs and brake shoes for automobiles.

The rubber composition of the present invention can be used also as a blend with thermoplastic resins such as polyamide resins, polyester resins, polyimide resins, polyacetal resins, polycarbonate resins, polyvinylidene fluoride resins, tetrafluoroethylene-ethylene copolymer resins and the like; and thermosetting resins such as urethane resins, epoxy resins, phenolic resins, urea-melamine resins, and the like.

BEST MODE FOR CONDUCTING THE INVENTION

Figure 1:
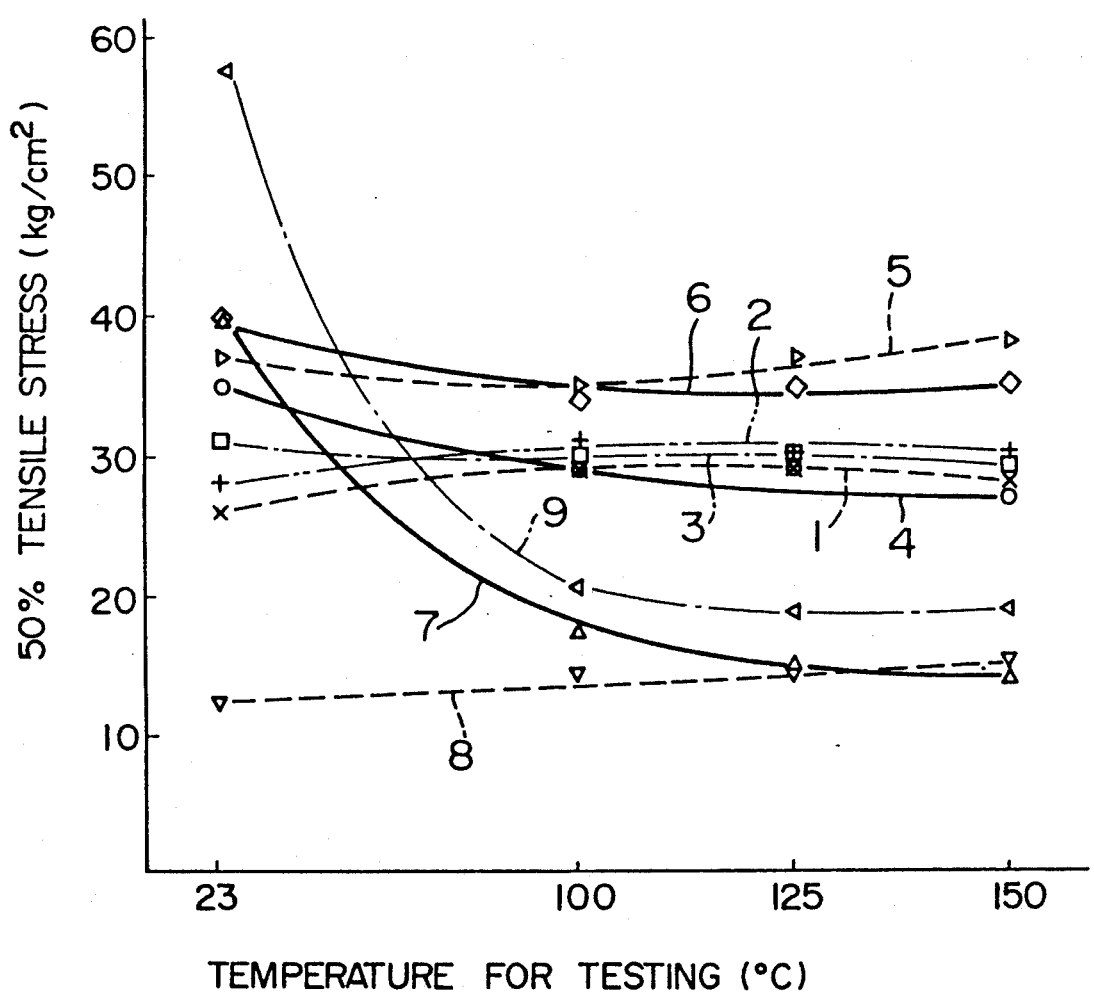
FIG. 1 is a graph showing the relationship between 50% tensile stress and temperature.

This invention is more concretely illustrated with the following examples. In the examples, comparative examples and referential examples, parts and percentages are all by weight unless otherwise specified.

REFERENTIAL EXAMPLE

In an autoclave, hydrogenated nitrile rubber (Zetpol 2020, mfd. by Nippon Zeon Co., Ltd., Mooney viscosity 82, nitrile content 37.6%, iodine value 28.2) was dissolved in methyl ethyl ketone, followed by adding thereto maleic anhydride (Nos. 1 to 4 in Table 1) or maleic acid (Nos. 5 and 6 in Table 1). Then, the reaction was carried out at 95° C. for 4 hours in an inert gas atmosphere while adding a solution of benzoyl peroxide in methyl ethyl ketone continuously. The reaction product was purified by five repetitions of reprecipitation with a mixed solvent of n-hexane and diethyl ether in the case of Nos. 1 to 4 in Table 1 or with methanol in the case of Nos. 5 and 6. After it was confirmed by a gas chromatography that no unreacted maleic anhydride or no unreacted maleic acid remained in the reaction product, i.e., the rubber produced, this rubber was dried. Thus, modified rubbers for evaluation tests were obtained. It was confirmed by infrared absorption spectra that the modified rubbers Nos. 1 to 4 listed in Table 1 contained succinic anhydride groups as added maleic anhydride and the modified rubbers Nos. 5 and 6 succinic acid groups as added maleic acid.

In Table 1 are tabulated characteristics of the modified rubbers experimentally prepared, the aforesaid hydrogenated nitrile rubber, carboxylated nitrile rubber (Nipol 1072J, mfd. by Nippon Zeon Co., Ltd.), and carboxylated hydrogenated nitrile rubber experimentally prepared by copolymerizing acrylonitrile, methacrylic acid and butadiene and then hydrogenating the resulting copolymer by a conventional method. All the rubbers had a gel content (the content of materials insoluble in methyl ethyl ketone which did not pass through a 80-mesh wire gauze) of zero.

TABLE 1

| No. | Modified rubber | | | | | | Carboxylated hydrogenated nitrile rubber | Hydrogenated nitrile rubber | Carboxylated nitrile rubber |
| --- | --- | --- | --- | --- | --- | --- | --- | --- | --- |
| | 1 | 2 | 3 | 4 | 5 | 6 | | | |
| Mooney viscosity (100° C.) | 86 | 89 | 94 | 99 | 91 | 96 | 88 | 82 | 49 |
| Nitrile content (%) | 37.2 | 36.7 | 35.8 | 34.9 | 36.3 | 35.5 | 34.3 | 37.6 | 27.3 |
| Acid equivalent ($\times 10^{-2}$ ephr) | 1.9 | 3.0 | 5.4 | 8.4 | 4.2 | 6.1 | 7.5 | 0 | 7.5 |
| Iodine value | 25.0 | 23.5 | 20.0 | 16.5 | 22.7 | 19.7 | 30.7 | 28.2 | — |

EXAMPLE

Rubber compositions were obtained by blending each of the various rubbers listed in Table 1 with various compounding ingredients according to the recipe shown in Table 2 by means of a cooling roll mill. The rubber compositions were subjected to press vulcanization at 160° C. for 30 minutes and then heat treatment, as secondary vulcanization, in a heating over at 150° C. for 2 hours at atmospheric pressure to obtain vulcanizaizates. Physical properties of the vulcanizates were evaluated in accordance with JIS K 6301. Tensile test was carried out by means of a tensile tester equipped with a thermostat in an atmosphere at each of 23° C., 100° C., 125° C. and 150° C. Low-temperature resistance was measured by means of a Gahman low-temperature torsion tester. Oil resistance was determined by measuring the volume change after immersion in JIS #3 oil at 120° C. for 270 hours. Dynamic viscoelasticity was measured by means of a spectrometer (mfd. by IWAMOTO SEISAKUSHO CO., Ltd.) under the following conditions: frequency 50 Hz, initial strain 15%, dynamic strain 0.2%, measuring temperature range −50° C. to 150° C. The results obtained are shown in Table 2. The temperature dependence of 50% tensile stress ($M_{50}$) in Table 2 is graphically shown in FIG. 1.

TABLE 2

| Composition and test result | Example 1 | Example 2 | Example 3 | Example 4 | Example 5 | Example 6 | Comparative Example 7 | Comparative Example 8 | Comparative Example 9 |
|---|---|---|---|---|---|---|---|---|---|
| Composition | | | | | | | | | |
| Modified rubber No. 1 | 100 | | | | | | | | |
| Modified rubber No. 2 | | 100 | | | | | | | |
| Modified rubber No. 3 | | | 100 | | | | | | |
| Modified rubber No. 4 | | | | 100 | | | | | |
| Modified rubber No. 5 | | | | | 100 | | | | |
| Modified rubber No. 6 | | | | | | 100 | | | |
| Carboxylated hydrogenated nitrile rubber | | | | | | | 100 | | |
| Hydrogenated nitrile rubber | | | | | | | | 100 | |
| Carboxylated nitrile rubber | | | | | | | | | 100 |
| HAF carbon black | 30 | 30 | 30 | 30 | 30 | 30 | 30 | 30 | 30 |
| Zinc oxide | 10 | 10 | 10 | 10 | 10 | 10 | 10 | 10 | 10 |
| Stearic acid | 1 | 1 | 1 | 1 | 1 | 1 | 1 | 1 | 1 |
| Thiokol TP-95 (1) | 5 | 5 | 5 | 5 | 5 | 5 | 5 | 5 | 5 |
| Percumyl D-40 (2) | 6 | 6 | 6 | 6 | 6 | 6 | 6 | 6 | 6 |
| Primary vulcanization | 160° C. × 30 min. | | | | | | | | |
| Secondary vulcanization | 150° C. × 2 hr. | | | | | | | | |
| Oscillating disk rheometer (160° C.) | | | | | | | | | |
| $T_5$ (min) | 1.3 | 1.4 | 1.6 | 1.8 | 1.5 | 1.7 | 2.1 | 2.1 | 1.8 |
| $T_{95}$ (min) | 33.5 | 41.0 | 47.3 | 49.0 | 41.8 | 47.6 | 14.4 | 26.6 | 20.3 |
| $V_{max}$ (kg f · cm) | 81.6 | 85.4 | 79.6 | 71.7 | 89.6 | 76.0 | 52.5 | 51.5 | 55.5 |
| Tensile test (3) | | | | | | | | | |
| 23° C. measurement | | | | | | | | | |
| $T_B$ (kg/cm$^2$) | 407 | 405 | 410 | 400 | 395 | 412 | 469 | 331 | 289 |
| $E_B$ (%) | 300 | 290 | 300 | 280 | 260 | 250 | 250 | 420 | 220 |
| $M_{50}$ (kg/cm$^2$) | 26 | 28 | 31 | 35 | 37 | 40 | 41 | 12 | 58 |
| $H_S$ (JIS-A) | 71 | 73 | 73 | 74 | 74 | 75 | 80 | 65 | 84 |
| 100° C. measurement | | | | | | | | | |
| $T_B$ (kg/cm$^2$) | 100 | 98 | 123 | 125 | 104 | 121 | 188 | 70 | 128 |
| $\Delta T_B$ (%) | −75 | −76 | −70 | −69 | −74 | −71 | −60 | −79 | −56 |
| $E_B$ (%) | 130 | 130 | 160 | 170 | 130 | 160 | 380 | 210 | 220 |
| $\Delta E_B$ (%) | −57 | −55 | −47 | −39 | −50 | −36 | +52 | −50 | ±0 |
| $M_{50}$ (kg/cm$^2$) | 29 | 31 | 30 | 29 | 35 | 34 | 17 | 14 | 20 |
| $\Delta M_{50}$ (%) | +12 | +11 | −3 | −17 | −5 | −15 | −63 | +17 | −66 |
| $H_S$ (JIS-A) | 69 | 71 | 69 | 70 | 72 | 71 | 66 | 62 | 74 |
| $\Delta H_S$ (point) | −2 | −2 | −4 | −4 | −2 | −4 | −14 | −3 | −10 |
| 125° C. measurement | | | | | | | | | |
| $T_B$ (kg/cm$^2$) | 71 | 73 | 91 | 93 | 73 | 95 | 149 | 48 | 86 |
| $\Delta T_B$ (%) | −83 | −82 | −78 | −77 | −82 | −77 | −68 | −85 | −70 |
| $E_B$ (%) | 110 | 110 | 140 | 140 | 100 | 130 | 380 | 180 | 180 |
| $\Delta E_B$ (%) | −63 | −62 | −53 | −50 | −62 | −48 | +52 | −57 | −18 |
| $M_{50}$ (kg/cm$^2$) | 29 | 30 | 30 | 29 | 37 | 35 | 15 | 14 | 19 |
| $\Delta M_{50}$ (%) | +12 | +7 | −3 | −17 | 0 | −13 | −63 | +17 | −67 |
| $H_S$ (JIS-A) | 70 | 71 | 71 | 71 | 73 | 72 | 70 | 57 | 68 |
| $\Delta H_S$ (point) | −1 | −2 | −2 | −3 | −1 | −3 | −10 | −8 | −16 |
| 150° C. measurement | | | | | | | | | |
| $T_B$ (kg/cm$^2$) | 61 | 64 | 71 | 72 | 73 | 91 | 109 | 32 | 75 |
| $\Delta T_B$ (%) | −85 | −84 | −83 | −82 | −82 | −78 | −77 | −90 | −74 |
| $E_B$ (%) | 130 | 140 | 190 | 270 | 110 | 130 | 320 | 180 | 180 |
| $\Delta E_B$ (%) | −57 | −52 | −37 | −4 | −58 | −48 | +28 | −57 | −18 |
| $M_{50}$ (kg/cm$^2$) | 28 | 30 | 29 | 27 | 38 | 35 | 14 | 15 | 19 |
| $\Delta M_{50}$ (%) | +8 | +7 | −6 | −23 | +3 | −13 | −66 | +25 | −67 |
| $H_S$ (JIS-A) | 71 | 72 | 72 | 71 | 73 | 73 | 69 | 54 | 68 |
| $\Delta H_S$ (point) | 0 | −1 | −1 | −2 | −1 | −2 | −11 | −11 | −16 |
| Low-temperature tortional test (Gehman) | | | | | | | | | |
| $T_5$ (°C.) | −29 | −27 | −25 | −22 | −27 | −24 | −20 | −31 | −15 |
| $T_{100}$ (°C.) | −35 | −33 | −32 | −30 | −33 | −32 | −29 | −37 | −29 |
| Oil resistance test (JIS #3 oil, 120° C. × 70 hrs immersion) Volume change (%) | 20.7 | 19.2 | 17.6 | 15.5 | 18.8 | 16.1 | 21.7 | 23.0 | 18.5 |
| Dynamic viscoelasticity test | | | | | | | | | |
| tan δ (30° C.) | 0.136 | 0.149 | 0.183 | 0.282 | 0.164 | 0.204 | 0.115 | 0.151 | 0.206 |
| (60° C.) | 0.096 | 0.101 | 0.108 | 0.128 | 0.099 | 0.111 | 0.179 | 0.151 | 0.178 |
| (90° C.) | 0.080 | 0.088 | 0.092 | 0.104 | 0.082 | 0.094 | 0.269 | 0.154 | 0.287 |
| (120° C.) | 0.072 | 0.079 | 0.081 | 0.093 | 0.072 | 0.083 | 0.262 | 0.147 | 0.295 |

TABLE 2-continued

| Composition and test result | No. of run | | | | | | | | |
|---|---|---|---|---|---|---|---|---|---|
| | Example | | | | | | Comparative Example | | |
| | 1 | 2 | 3 | 4 | 5 | 6 | 7 | 8 | 9 |
| (150° C.) | 0.069 | 0.074 | 0.075 | 0.087 | 0.0066 | 0.077 | 0.237 | 0.139 | 0.266 |

(1) a high-molecular-weight polyether plasticizer mfd. by Thiokol Chemical
(2) dicumyl peroxide (conc. 40 wt %) mfd. by Nippon Oils and Fats Co., Ltd.
(3) $T_B$: tensile strength
  $E_B$: elongation
  $M_{50}$: 50% tensile stress
  $H_S$: hardness
  Δ: A rate of change of each property other than $H_S$ relative to its value at 23° C., or a difference of $H_S$ value at each temperature from that at 23° C.

From the results shown in Table 2 and FIG. 1, it can be seen that the modified hydrogenated nitrile rubbers obtained by addition of maleic anhydride or maleic acid have the following characteristics, as compared with the hydrogenated nitrile rubber and the carboxylated hydrogenated nitrile rubber. The increase of hardness is suppressed, resulting in a high stress and a high strength. The stress at high temperatures is high and the stress hardly changes, depending upon the changes of temperature. The hardness hardly changes even at high temperatures. Unlike in the case of the carboxylated hydrogenated nitrile rubber, no peak of tan δ due to an ionic bond or a cluster appears. The modified hydrogenated nitrile rubbers are excellent in low-temperature resistance and oil resistance. It can be seen that thus, the modified hydrogenated nitrile rubbers obtained by addition of maleic anhydride or maleic acid are utterly different from the carboxylated hydrogenated nitrile rubber obtained by copolymerization of (meth)acrylic acid through both maleic anhydride or maleic acid and (meth)acrylic acid are carboxylic acids.

INDUSTRIAL APPLICABILITY

The rubber composition of the present invention has excellent characteristics which have heretofore been unattainable, and it can be used for producing various rubber products, for example, belts such as timing belts, and the like; hoses such as high-pressure oil-resistant hoses, fuel hoses for automobiles, and the like; various rubber products for oil well or gas well; and various sealing materials such as O rings, oil seals and the like.

What is claimed is:

1. A rubber composition comprising (a) a polymer obtained by adding maleic anhydride, a maleic acid monoalkyl ester, maleimide, N-methylmaleimide, N-ethylmaleimide or N-phenylmaleimide, to a nitrile-group-containing polymer having an iodine value of 80 or less and (b) an oxide of a metal in Group 2 of the periodic table.

2. A rubber composition according to claim 1 which contains a sulfur-containing vulcanizing agent.

3. A rubber composition according to claim 1 which contains an antioxidant or an antiozonant.

4. A vulcanized rubber composition obtained by heating the rubber composition of any one of claim 1 to 3 in the presence of a vulcanizing agent.

5. A rubber composition comprising (a) a polymer obtained by adding maleic anhydride, a maleic acid monoalkyl ester, maleimide, N-methyl maleimide, N-ethyl maleimide or N-phenyl maleimide, to a nitrile-group-containing polymer having an iodine value of 80 or less, (b) an oxide of a metal in Group 2 of the periodic table and (c) a polyhydric alcohol.

* * * * *